No. 799,863. PATENTED SEPT. 19, 1905.
J. R. MEYERS.
CHEESE.
APPLICATION FILED MAR. 27, 1903.
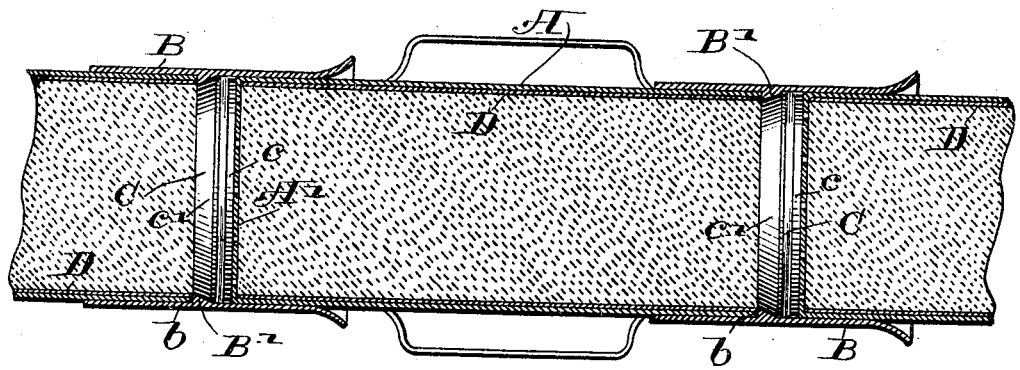
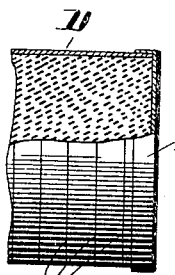
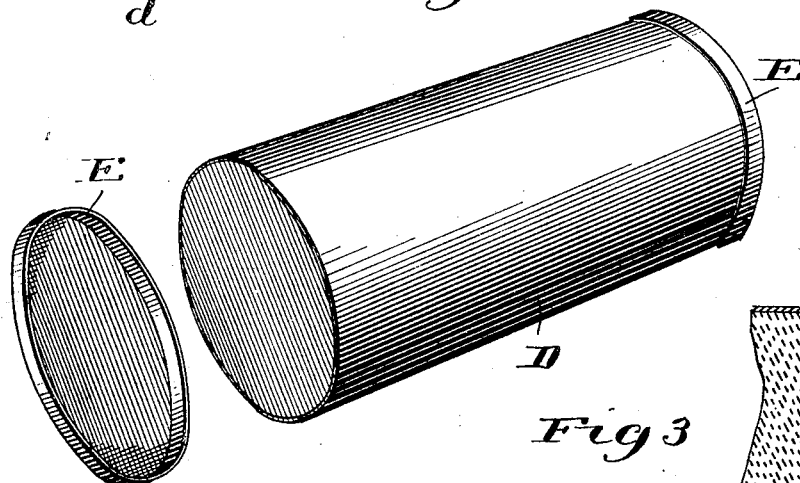
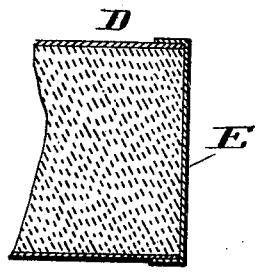
Witnesses:-
Carl A. Crawford
William H. Hall
Inventor:-
Julius R. Meyers
By Poole & Brown
his Attorneys

UNITED STATES PATENT OFFICE.

JULIUS R. MEYERS, OF CHICAGO, ILLINOIS.

CHEESE.

No. 799,863.      Specification of Letters Patent.      Patented Sept. 19, 1905.

Application filed March 27, 1903. Serial No. 149,803.

*To all whom it may concern:*

Be it known that I, JULIUS R. MEYERS, of Chicago, in the county of Cook and State of Illinois, have invented certain new and useful Improvements in Cheese; and I do hereby declare that the following is a full, clear, and exact description thereof, reference being had to the accompanying drawings, and to the letters of reference marked thereon, which form a part of this specification.

This invention relates to a novel cheese or cheese-package which includes both the cheese proper and a casing or covering therefor.

The invention consists in the matters hereinafter described, and pointed out in the appended claim.

In making a cheese embodying my invention the use of the cloth covering or bandage heretofore employed in the pressing of cheese is dispensed with, and in place thereof in the operation of pressing the cheese is compressed within an open-ended tubular casing or covering made of paper, strawboard, or other like sheet material of fibrous or porous character having considerable thickness or body, the said casing or covering in the pressing operation being confined within a surrounding tubular wall or mold, whereby the rupturing or bursting of the casing or covering in such pressing operation is prevented. When the pressing is completed, the cheese and its covering or casing are removed from the mold and cured in the usual manner.

The tubular casing or covering in which the cheese-curds are compressed, forced, or packed in the operation described adheres firmly to the body of the cheese and takes the place of the cloth covering and hardened surface, layer, or rind which ordinarily results from the drying of the outer surface of the cheese in curing. The casing therefore serves not only to confine and hold in shape the cheese when first taken from the mold and in a soft state, but it also serves as a permanent covering to protect and hold in shape the finished cheese in handling and transportation. Such casing, moreover, being of considerable thickness prevents the drying or hardening of the surface portion of the cheese, as occurs in the use of a thin cloth bandage. A cheese provided with such a casing is practically without any thick rind, and while it may be somewhat drier in its surface part, which is in contact with the casing, is yet preserved in such condition that all of it is usable and the waste which results from the presence of such thick rind is avoided.

I may provide the cheese with flanged caps or covers adapted to fit over the ends of the tubular casing in which the cheese is compressed, said caps or covers being made of paper or other material, preferably of the same character as used for the casing. Such caps or covers will be applied after the cheese has been cured and serve to protect the surface of the cheese where exposed at the ends of the tubular casing in handling and transportation.

I have shown in the accompanying drawings a form of cheese-mold such as is illustrated and described in a separate application for Letters Patent of the United States, Serial No. 149,802, filed by me simultaneously herewith, and which is adapted for carrying out the novel process above described. Said drawings also illustrate the cheese or cheese-package resulting from said process.

In the drawings, Figure 1 is a view in central longitudinal section of a cheese-mold having a tubular cheese-casing therein. Fig. 2 is a perspective view of a completed cheese-package, the cap or cover at one end thereof being shown detached. Fig. 3 is a sectional view of one end of the cheese and its cap or cover. Fig. 4 is a view, partially in elevation and partially in section, of one end of a cheese made by the use of the mold illustrated when the same is completed and ready for the market.

As shown in Fig. 1, A indicates the body of the mold or hoop, which is of tubular form of uniform internal diameter from end to end. In the drawings the hoop is shown as made of sheet metal and of uniform thickness throughout. One end of the tubular mold $a$ is closed by an end wall A', which is perforated, and, as herein shown, is made integral with or permanently attached to the side wall of the mold, as heretofore usual in such devices. At its opposite end, or that in which the material is inserted, the mold is provided with a separate tubular ring B, adapted to fit over the end portion of the body A and having between its ends an internal shoulder $b$, which when the ring is in place on the mold-body fits or bears against the end margin of said body. Said shoulder $b$ is, in a mold adapted for use in a gang-press, according to the usual practice made of uniform internal size throughout the principal part of its length, and the internal shoulder $b$ thereof is in that case formed by or upon the inner margin of an inwardly-extending rib $b'$ on said ring B. Within the outer part of the ring B is located a follower C, which is movable endwise therein, and through the medium of which pressure is applied to the material within the mold. The shoulder $b$ referred to is made wider than the thickness of the end of the body A, so that when the ring B is placed on the body said shoulder projects a short distance inside of the inner face of said body and far enough to cover or project over the end margin of a tubular casing or covering D, which is inserted within the body of the mold before the material is placed therein and which forms an adherent covering for the cheese after the same is finished. The said follower C has a larger part $c$, which fits closely within the ring B, and a smaller part $c'$, which is adapted to enter within the rib B', so that the flat face of said smaller part may be forced inwardly until it is in line with the shoulder $b$ and the end of the casing or covering B.

In carrying out my novel process by the use of the mold described the ring B is removed from the body A and the tubular casing D then inserted therein. The ring B is then placed over the end of the mold with the shoulder $b$ in abutting relation to the ends of the body A and casing D. The follower is then inserted in the ring and the pressing accomplished so as to compress or force all of the material into the tubular casing, the face of the smaller end of the follower for this purpose being brought in line with the end of the casing, as seen in Fig. 1. During the pressing operation the tubular casing D is held from being burst or ruptured through the internal pressure brought thereon by the surrounding mold, in which it is adapted to closely or tightly fit. At the conclusion of the pressing operation the cheese and its casing, which firmly adheres thereto, are removed together from the mold. The cheese is then ready for curing or drying, which is accomplished in the usual manner, the paper casing preventing exposure of the sides of the cheese to the action of external air or moisture, and thereby avoiding the formation of mold on the sides of the cheese, while the uncovered surfaces of the cheese at the ends of the casing greatly facilitate the drying operation.

The finished cheese is shown in Figs. 2 and 3, wherein D indicates the tubular casing surrounding the body of the cheese, the end portions of which latter are flush with the ends of the casing. Caps or flanged covers for the cased cheese are indicated by E E. Said caps are adapted to fit closely over the ends of the casing and when applied serve to cover and protect the end surfaces of the cheese. Said covers may be made of any suitable material, but preferably they are made of paper or the like, in which case they may be secured to the ends of the casing by adhesive material, if desired.

It will be understood that the casing or covering constitutes, in effect, a part of the finished cheese, because by reason of the fact that in the pressing operation the portions of the curds at the surface of the curds which come in contact with the paper casing are forced or pressed into the interstices of the paper casing, so that to some extent the curds or the more liquid parts thereof penetrate and fill the said interstices of the paper casing and the latter becomes knit or firmly adherent to the body of the cheese and has the nature of an artificial rind.

In cutting the cheese the casing may be cut or severed with the cheese, and in a cheese of cylindric shape—that is, one of uniform diameter throughout its length, such as is shown—portions may be severed therefrom by cutting transversely through the casing and cheese, so as to form round or disk-shaped slices. The cutting of pieces of uniform weight, as pounds or half-pounds, will be facilitated by means of circumferential guide marks or lines $d$ on the outer surface of the casing, as shown.

I claim as my invention—

A cheese provided with an open-ended, tubular casing or covering of paper having considerable body or thickness, the interstices of the inner surface of which are penetrated and filled by the surface portion of the cheese and which adheres to the cheese so as to form an artificial rind.

In testimony that I claim the foregoing as my invention I affix my signature, in presence of two witnesses, this 23d day of March, A. D. 1903.

JULIUS R. MEYERS.

Witnesses:
 TAYLOR E. BROWN,
 GERTRUDE BRYCE.